DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 14, 1972

896 O.G. 423

T896,036
SHOE LINER

Charles Lewis King, Wilmington, and Joseph Henry Ryan, Jr., Claymont, Del., assignors to E. I. du Pont de Nemours and Company, Wilmington, Del.

Continuation of application Ser. No. 849,518, Aug. 12, 1969. This application May 19, 1971, Ser. No. 145,063
Int. Cl. A43b *23/07*
U.S. Cl. 161—92
No Drawing. 6 Pages Specification

A shoe linear relatively light in weight and having excellent cushioning properties, with excellent conformation to the design and shape of the shoe without its wrinkling in use comprising a laminated structure of:

(a) A microcellular foam sheet of a thermoplastic crystalline polymer prepared from a polyolefin such as linear polyethylene or polypropylene, a polyester such as polyalkylene terephthalate or an isothalate, or a polyamide with isotactic polypropylene preferred, wherein the foam sheet is comprised of polyhedral-shaped closed cells whose median diameter is at least 500 microns having cell walls characterized by a non-uniform texture, said sheet having a work-to-break value of at least 10,000 inch pounds per cubic inch, a maximum density of 0.03 gram per cubic centimeter and a specific work-to-tear value of at least 250 inch pounds per square inch, laminated to (b) A shoe lining fabric material such as cotton; silk; rayon; nylon, with the preferred fabric being nylon or rayon in a tricot or satin weave; or a nonfabric lining material such as polyurethane or polyvinyl chloride.

Lamination can be accomplished by (a) Nonadhesive bonding, i.e., heating and pressing together the surfaces to be laminated, or (b) Adhesive bonding with a synthetic rubber pressure-sensitive adhesive or a hot melt adhesive such as an ethylene polymer or a copolymer of ethylene and vinyl acetate.